A. J. BULL.
IMITATION GRAINING TOOL.
APPLICATION FILED APR. 20, 1918.
1,298,882.
Patented Apr. 1, 1919.
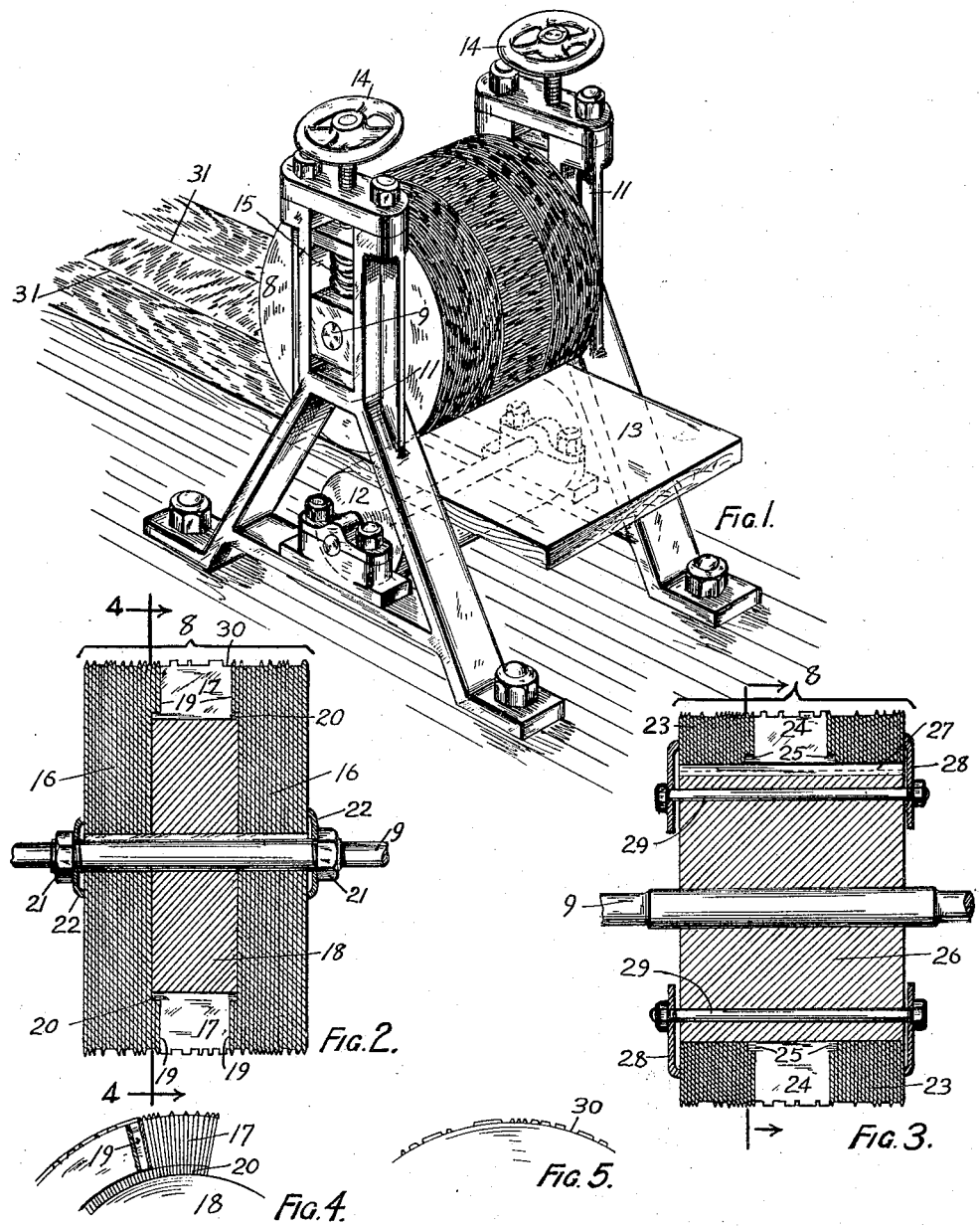

UNITED STATES PATENT OFFICE.

ARTHUR JOHN BULL, OF MAYFIELD, NEWCASTLE, NEW SOUTH WALES, AUSTRALIA.

IMITATION-GRAINING TOOL.

1,298,882.

Specification of Letters Patent.

Patented Apr. 1, 1919.

Application filed April 20, 1918. Serial No. 229,706.

*To all whom it may concern:*

Be it known that I, ARTHUR JOHN BULL, a subject of the King of Great Britain and Ireland, residing at Ida street, Mayfield, Newcastle, in the State of New South Wales, Commonwealth of Australia, have invented certain new and useful Improvements in Imitation-Graining Tools, of which the following is a specification.

This invention relates to the imitation of the grain of wood by incising the surface of wood or other suitable material with figured markings in small cuts and/or punctures of a form appropriate to and in a pattern in accordance with the natural grain of the timber which it is desired to imitate.

The object of the present invention is to provide a tool whereby the graining of a large surface may be more quickly and easily performed, and which may be so constructed and arranged as to give an inlaid effect by differently graining two or more parallel strips of the surface of one piece of material, and parquetry effect by differently graining various geometrically arranged areas of the surface of the material.

With this object the invention consists of a roller the periphery of which is provided with a plurality of spaced cutting edges which are interrupted or broken in accordance with a pre-arranged design representing the grain of the wood which it is desired to imitate, so that as the roller is moved under pressure over the surface of the material which it is desired to figure, the cutting edges produce parallel cuts or punctures while the interruptions leave blank spaces. And the cutting edges and interruptions may be so arranged relatively as to produce on the material an imitation of the grain of any wood provided of course that the grain is one which may be imitated by interrupted lines of cuts or punctures. Obviously the pattern will be repeated when the roller is required to make more than one revolution in traversing over the material.

The roller is adapted to be rotatably mounted in a frame suitable for hand operation or as part of a machine through which the material to be treated is passed.

The cutting edges may be integral with a solid roller, or may be on the edges of a plurality of disks clamped together to constitute the roller. Alternatively again the roller may be composed of rings having interrupted cutting edges mounted on a core and provided with means for clamping or holding them in any relative positions. The cutting edges and interruptions on one circumferential or axial strip of the roller may be differently arranged to those on another strip or strips to produce inlay effect by one operation of the roller: and they may also be differently arranged in various geometrically disposed areas of the roller, to produce a parquetry effect on the whole area of the material traversed by the roller or any portion thereof.

The invention will be further described with reference to the accompanying drawings in which is illustrated a rotary tool according to this invention, its periphery being divided circumferentially into three areas each adapted to impart a different effect. This is illustrated merely as an example, and it is to be understood that such areal division may not be required and that when required the proportions and arrangement of the areal divisions may be varied according to the effect desired to be produced.

As a tool constituted by a solid roller having the cutting edges formed on its periphery does not afford facility for sharpening said edges when blunted by use, the solid tool is not at present the preferred type. In practice I employ a tool built up by clamping together a plurality of disks or of annular rings, or by a plurality of blades arranged radially to the axis of the roller, or when a paneling effect is desired, by a combination of such disks and/or rings and blades. The combination construction is illustrated in the accompanying drawings in which:—

Figure 1 is a perspective view showing the tool arranged to give a paneling effect, mounted in a suitable frame carrying an under or abutment roller, and also showing the effect produced on a board.

Fig. 2 is an axial section of the tool illustrated in Fig. 1, and

Fig. 3 a similar view of a modified construction employing rings instead of complete disks.

Fig. 4 is a part cross sectional elevation on line 4. 4. of Fig. 2 partly broken away to illustrate the construction and Fig. 5 a part side elevation of the edge of one of the disks or rings.

The roller tool 8 is carried by an axle or shaft 9 mounted in bearing blocks 10 slidably supported in frame members 11. 11. which also carry an abutment roller 12 between which and the roller tool 8 the material 13 is passed to receive the markings representing the natural grain of timber, the required pressure being regulated by means of handwheels 14. 14. the screwed spindles of which bear upon springs 15 which in turn bear upon the blocks 10.

The roller tool may be built up wholly by a plurality of metal (steel) disks such as 16. 16. in Fig. 2, and thereby give the effect of one piece of timber only, or by a set or sets of such disks 16. 16. and a set of blades such as 17 arranged about a central core 18 and held in position by one or more rings 19. 19. arranged about laterally extending lugs 20. 20. formed on said blades. The whole is clamped together by nuts 21. 21. on the shaft 9 and bearing against washers 22. This construction is clearly shown in Figs. 2 and 4 and is also represented in Fig. 1.

Alternatively the tool is built up of annular rings such as 23. 23. in Fig. 3, or by the combination of such rings with blades 24 having laterally extending lugs 25 underlying the innermost rings which are therefore made less in depth than the others.

The whole of the peripheral elements are arranged about a central core 26 mounted on the shaft 9, and are secured by a key 27 and clamped between annular washers 28. 28. by bolts 29.

The outer edges of the disks, rings or blades as the case may be are beveled to produce cutting edges which are broken or interrupted as at 30 and arranged according to the markings desired. Where paneling or like effect is required the disks or rings contiguous to a peripheral area of different arrangement may have complete cutting edges to produce lines of demarcation between the panels as shown at 31. 31. in Fig. 1.

To produce a cross grained effect only, as in the center panel in Fig. 1, the periphery of the roller tool may be formed of blades such as 17 or 24 secured about a core as hereinbefore described or by other known means.

What I claim and desire to secure by Letters Patent is:—

1. An imitation graining tool consisting of a roller comprising in combination a plurality of disks having interrupted cutting edges, a plurality of blades arranged in non-parallel relation to said disks, a central core about which said blades are disposed, means for holding said blades in position and means for clamping the whole together.

2. An imitation graining tool consisting of a roller comprising in combination a plurality of members having interrupted cutting edges, a plurality of blades arranged in non-parallel relation to said members, a central core about which said blades are disposed, means for holding said blades in position, and means for clamping the whole together.

Signed at Newcastle N. S. W. this twenty-sixth day of February 1918.

ARTHUR JOHN BULL.

Copies of this patent may be obtained for five cents each, by addressing the "Commissioner of Patents, Washington, D. C."